United States Patent

Kelly et al.

[11] 3,876,137
[45] Apr. 8, 1975

[54] CONDITION RESPONSIVE CONTROL DEVICES

[75] Inventors: Samuel T. Kelly, Los Angeles; Frank J. Heinz, Orange, both of Calif.

[73] Assignee: Robertshaw Controls Company, Richmond, Va.

[22] Filed: Oct. 24, 1972

[21] Appl. No.: 300,059

[52] U.S. Cl............... 236/48 A; 236/101; 251/75
[51] Int. Cl. ........................................ G05d 23/10
[58] Field of Search ...... 236/48 A, 101, 87; 251/75, 251/157, 358, 11, 65, 333

[56] References Cited
UNITED STATES PATENTS

| | | | |
|---|---|---|---|
| 1,404,898 | 1/1922 | Ryan | 236/48 A |
| 1,499,947 | 7/1924 | Ryan | 236/48 A |
| 1,875,511 | 9/1932 | Shivers | 251/75 |
| 2,575,086 | 11/1951 | Atchison | 236/48 A |
| 3,102,712 | 9/1963 | Zilk | 251/298 |
| 3,168,283 | 2/1965 | Gamble | 251/358 |
| 3,224,727 | 12/1965 | Dale et al. | 236/48 A |

Primary Examiner—Carroll B. Dority, Jr.
Assistant Examiner—W. E. Tapolcai, Jr.
Attorney, Agent, or Firm—Anthony A. O'Brien

[57] ABSTRACT

Condition responsive control devices including a control valve having a valve member carried on the operating end of a valve lever which is operated by a condition sensing assembly through a thrust lever. The condition sensing assembly has an actuator member, movement of which is amplified by a lever assembly including the thrust and valve levers to operate the control valve with snap-action aided by a magnet. The condition sensing assembly includes a hydraulic temperature sensing element in one embodiment and a bimetal temperature sensing element in another embodiment. The operating end of the valve lever has an abutment surface and a soft valve face recessed therefrom such that the abutment surface engages a shoulder around the valve seat to provide a positive stop for the valve lever and to fix the gap between the valve lever and the magnet.

18 Claims, 5 Drawing Figures

CONDITION RESPONSIVE CONTROL DEVICES

BACKGROUND OF THE INVENTION

1. Field of the Invention

The present invention pertains to condition responsive control devices and, more particularly, to such control devices for operating a main valve in a combination control device.

2. Discussion of the Prior Art

Condition responsive control devices are conventionally utilized to operate main control devices for various appliances and equipment, such main control devices selectively supplying energy or an energy conversion material to operate the appliances and equipment. For heating applications utilizing fluid fuel appliances, the main control device normally includes a main passage having a main diaphragm valve therein for controlling a flow of fuel to a main burner, and a bleed control system for operating the main diaphragm valve. For on-off control of the main valve, an actuator responsive to temperature is utilized to control a valve in the bleed system such that the main valve is open when the sensed temperature is below a preset value and closed when the sensed temperature is above a preset value. The preset operating temperatures for such main control devices are normally determined by adjustable dials which initially position a member movable by a temperature sensing element in accordance with changing temperature. Various condition responsive control devices have been proposed in the prior art; however, such control devices are required to have a number of operating characteristics in order to be acceptable. Some of the more important characteristics of condition responsive control devices include precisely maintained and adjustable operating temperature differentials, accurate amplification of movement of a temperature sensing assembly, snap-action operation of the control valve to prevent graduation, creep or throttling, protection against overriding of the temperature sensing assembly, good sealing of the control valve, low cost and compact physical dimensions.

While proposed condition responsive control devices have been specifically designed to provide the above characteristics, such proposed control devices have normally sacrificed one characteristic for another and thus have not been entirely acceptable. For instance, it has been proposed to use a resilient or soft valve face for the control valve in order to facilitate operation of the control valve by levers for amplification; however, while soft valve faces provide excellent wear resistant seals, indentation or compression of the valve face is not limited thereby altering the operating temperature differential between opening and closing of the control valve. The distortion of the soft valve face is a particularly acute problem when a magnet assembly is used to provide snap-action for the control valve in that any variation in the gap between the armature, which is normally carried by a lever near the valve face, and the magnet will cause the control valve to be operated at varying temperatures. Thus, condition responsive control devices of the prior art have not provided accurate operating condition differentials while still functioning to prevent graduation and throttling when the control valve is operated by levers to amplify movement of a temperature sensing element.

SUMMARY OF THE INVENTION

Accordingly, it is a primary object of the present invention to provide a condition responsive control device having all of the above characteristics.

Another object of the present invention is construct a condition responsive control device having a snap-acting control valve operated at a stable operating temperature differential in response to movement of a temperature sensing element.

A further object of the present invention is prevent opening of a control valve during override of a temperature sensing assembly for a condition responsive control device.

The present invention has another object in the use of a soft valve face with a control valve while limiting distortion by indentation or compression of the valve face.

Yet an additional object of the present invention is to utilize a lever assembly to operate a control valve, the lever assembly including a thrust lever movable by an actuator member in accordance with a changing condition, a valve lever engaging the thrust lever at one end and carrying a valve member at the other end and a power spring acting directly on the valve lever.

Some of the advantages of the present invention over the prior art are that the operating temperature differential is stable and easily adjusted, a temperature sensing assembly of low cost can be utilized, graduation or throttling of the control valve is prevented by use of a magnet near the valve to provide snap-action and eliminate any tendency for the valve member to creep away from or toward the valve seat, a soft valve face is utilized which minimizes graduation, the gap between the magnet and armature is not affected by the soft valve face, a power spring is positioned to absorb override of the temperature sensing assembly, and the bi-metal sensing assembly provides fail-safe operation, is of low cost and is compact compared to other sensing assemblies.

The present invention is generally characterized in a condition responsive control device including a housing; a control valve including a valve seat formed in the housing, a valve member cooperating with the valve seat and a shoulder adjacent the valve seat; a condition responsive assembly having an actuator member movable with changes in sensed conditions, a lever assembly pivotally mounted in the housing to engage the actuator member and having an operating end carrying the valve member and an abutment surface with the valve member recessed relative to the abutment surface; and a magnetic assembly having an armature carried by the lever assembly and a magnet mounted in the housing adjacent the control valve, the abutment surface engaging the shoulder when the control valve is closed to define a fixed gap between the magnet and the armature.

Other objects and advantages of the present invention will become apparent from the following description of the preferred embodiments taken in conjunction with the accompanying drawings.

DESCRIPTION OF THE PREFERRED EMBODIMENTS

Figure 1:
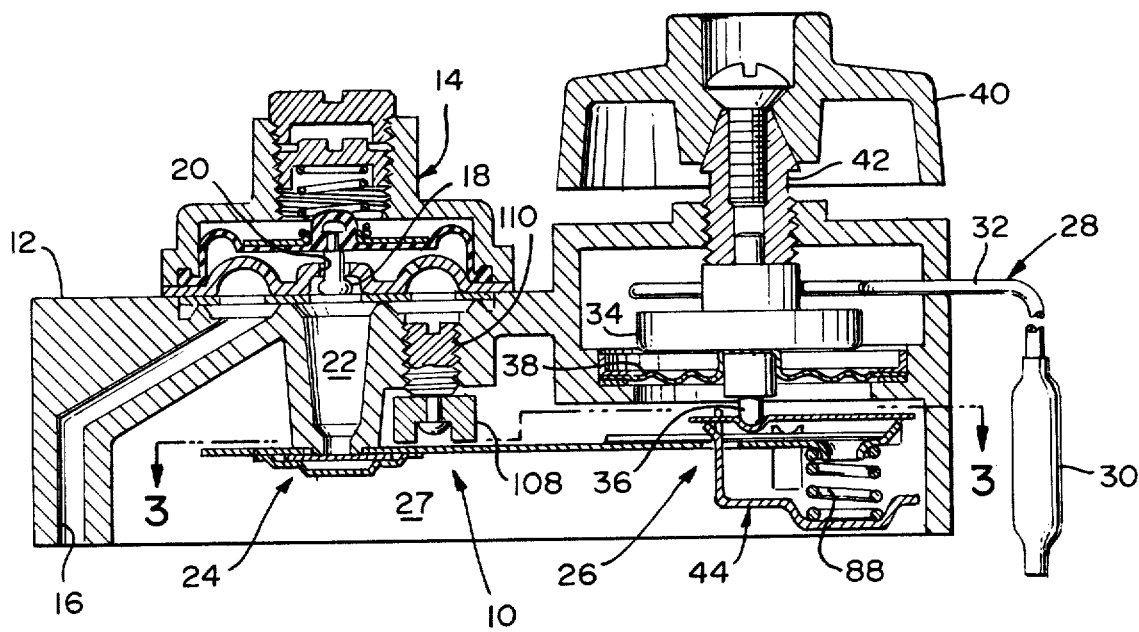
FIG. 1 is a side elevation in section of a condition responsive control device according to the present invention in the off state.

A condition responsive control device 10 according to the present invention is illustrated in FIG. 1 and includes a housing 12 adapted to be mounted on the casing of a combination control device to communicate with a chamber on the underside of a main diaphragm valve. The condition responsive control device of the present invention can be used to control any suitable device such as the combination control device of U.S. Pat. No. 3,592,225, the specification of which is incorporated herein by reference. A pressure regulator 14 is mounted on casing 12 and adapted to receive outlet pressure from the combination control device downstream of the main diaphragm valve through a passage 16, the pressure regulator including a valve member 18 cooperating with an annular valve seat 20 to control flow between passage 16 and a chamber 22 defined by a slightly conical wall depending from valve seat 20. The condition responsive control device 10 need not be utilized with a pressure regulator; however, by placing the condition responsive control device and the pressure regulator in series in the same bleed path, the bleed path may be utilized to regulate outlet pressure at the main diaphragm valve as well as for on-off control.

Condition responsive control device 10 includes a control valve 24 operated by a lever assembly 26 to control communication between chamber 22 and a chamber 27 in housing 12, the lever assembly being actuated by a temperature sensing assembly 28 which includes a bulb 30, a capillary tube 32 and a power element 34 filled with a thermally responsive expansible fluid. When the temperature sensed by bulb 38 increases, the fluid expands to increase the pressure of an internal chamber in the power element 34 to move a wall of the chamber and move or extend an actuator member 36 away therefrom, and a decrease in sensed temperature compresses the fluid to decrease the internal chamber pressure and retract or withdraw the actuator member 36. Actuator member 36 is mounted with a sealing diaphragm 38 in housing 10, and a temperature adjusting dial 40 engages a conical end of a temperature adjusting screw 42 threadedly engaging housing 10 with an opposite end abutting power element 34 such that rotation of temperature dial 40 rotates temperature adjusting screw 42 to position the power element 34 relative to the housing. Any condition sensing assembly can be used with the present invention with the hydraulic temperature sensing assembly described above being advantageous due to its low cost relative to assemblies using bellows and its small space requirements.

Figure 2:
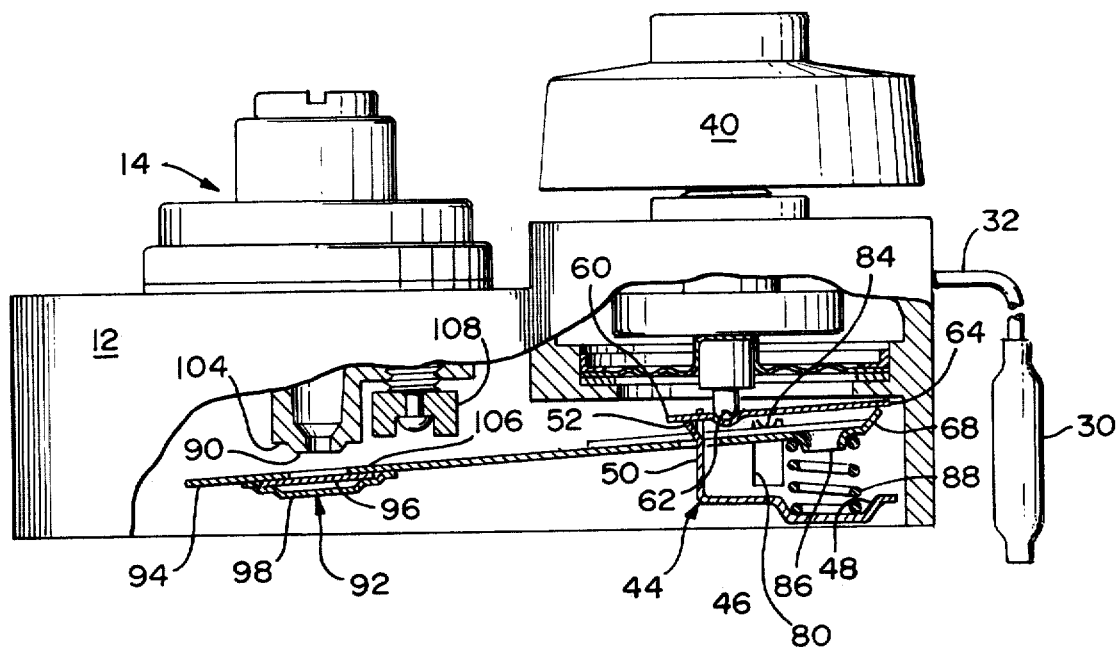
FIG. 2 is a broken side elevation of the condition responsive control device of FIG. 1 in the on state.
Figure 3:
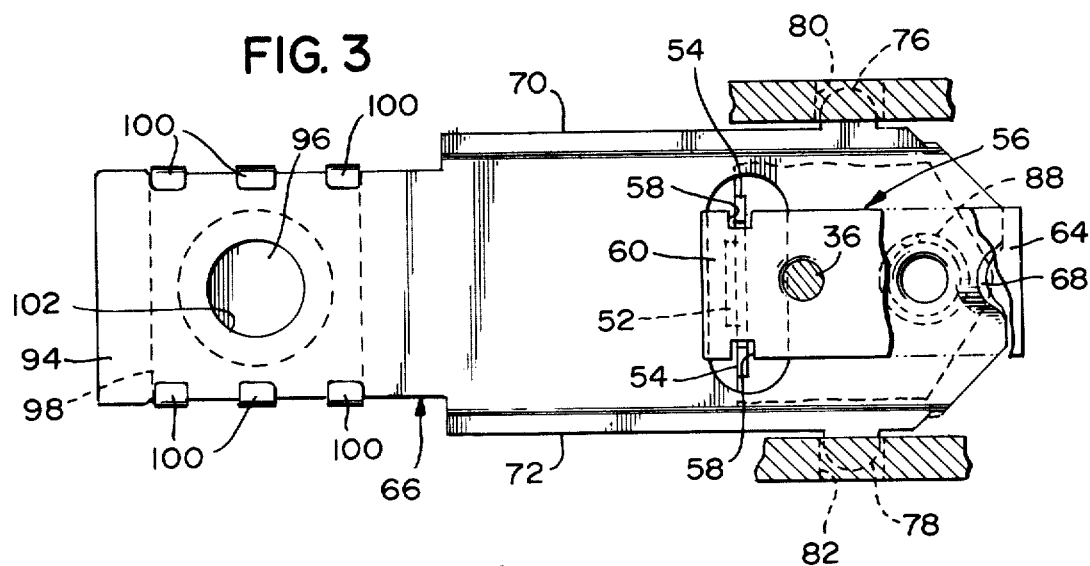
FIG. 3 is a section taken along line 3—3 of FIG. 1 illustrating the lever assembly.
Figure 4:
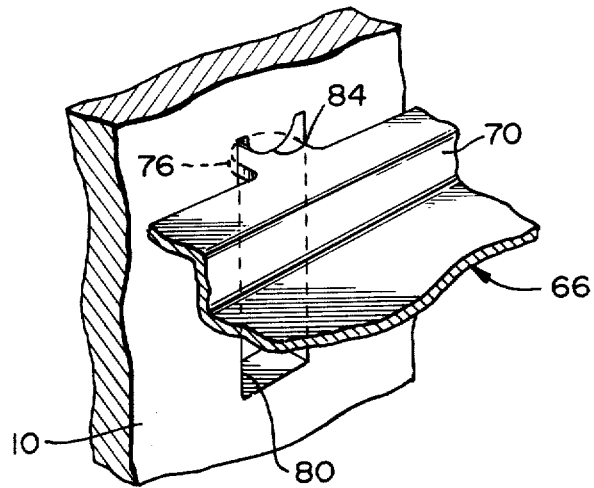
FIG. 4 is a broken perspective of the fulcrum mounting of the valve lever of the assembly of FIG. 3.

Lever assembly 26 includes a fulcrum bracket 44 having a base 46 with a circular recess 48 therein and an upstanding leg 50 having a tongue 52 bent from the top thereof to define ears 54 on either side thereof, as shown in FIG. 3. Fulcrum bracket 44 is mounted in the housing 10 with base 46 adapted to abut a wall of the housing of a combination control device upon which housing 10 is mounted. A thrust lever 56 has notches 58 in opposite lateral edges at an end 60 thereof to receive ears 54 of the fulcrum bracket 44 such that end 60 is supported on tongue 52 to permit the thrust lever to pivot at end 60 about the fulcrum formed by tongue 52. Thrust lever 56 has an indentation 62 in the upper surface thereof to receive the rounded end of actuator member 36, and an end 64 of the thrust lever is spaced from indentation 62 by a distance substantially greater than the distance between indentation 62 and end 60 such that movement of actuator member 34 is amplified at end 64 of the thrust lever. A rigid valve lever 66 has an upturned end 68 abutting end 64 of the thrust lever 56 and opposite lateral upstanding side flanges 70 and 72 extending from end 68 partially along the length of the valve lever past a laterally aligned elongated slot 74 through which leg 50 of the fulcrum bracket extends. Lugs 76 and 78 extend from flanges 70 and 72 and are received in openings 80 and 82 in walls of housing 10, respectively, to engage and pivot about protrusions 84, as shown in FIGS. 3 and 4. Valve lever 66 has an annular protrusion 86 extending from the bottom thereof aligned with the recess 48 in the base of the fulcrum bracket 44, and a helical power spring 88 is mounted in compression between fulcrum bracket 44 and valve lever 66 seated in recess 48 and around protrusion 86. Protrusion 86 is disposed between lugs 76, 78 and end 68 such that spring 88 biases the valve lever counterclockwise looking at FIGS. 1 and 2.

Control valve 24 includes a projecting annular valve seat 90 disposed at the end of chamber 22 and a valve member 92 carried at an operating end 94 of valve lever 66. Valve member 92 includes a soft valve face 96 mounted on operating end 94 by a valve clip 98 which has tabs 100 bent over the operating end of valve lever 66 to sandwich an edge portion of the soft valve face 96 between aperatures 102 in the valve lever 66 and the valve clip 98 beneath the circular aperture 102 in the valve lever. An annular shoulder 104 extends radially around valve seat 90 to abut a marginal abutment surface 106 around aperture 102 when control valve 24 is closed.

A magnet assembly for providing control valve 24 with snap-action operation is disposed adjacent operating end 94 of valve lever 66 which either carries an armature or is made of a ferromagnetic material to act as an armature for the magnet assembly. The magnet assembly includes a permanent magnet 108 secured to a threaded adjustment stud 110 which threadedly engages a wall of housing 12 beneath the pressure regulator 14 such that stud 110 can be adjusted after removing the pressure regulator by screwing the stud into or out of the housing 12.

The operation of condition responsive device 10 will be described with reference to FIGS. 1 and 2 wherein the device is shown in the off and on states, respectively. The operating temperature for the condition responsive control device 10 is initially set by rotation of temperature dial 40 to screw temperature adjustment screw 42 into or out of the housing 10 and, accordingly, preset the position of actuator member 36 relative to the lever assembly 26. With the temperature sensed in a space by bulb 30 above the nominal preset temperature, the condition responsive control device 10 is in the off state with control valve 24 closed such that the main diaphragm valve is closed due to the increased pressure beneath the diaphragm sensed from chamber 27. When the temperature sensed by bulb 30 decreases below the preset temperature, actuator member 36 will be retracted or drawn into power element 34 thereby permitting power spring 88 to pivot thrust lever 56 counterclockwise about tongue 52 and to pivot valve lever 66 counterclockwise about protrusion 84. Thus, thrust lever 56 and valve lever 66 of the lever assembly are both pivoted counterclockwise about their respective fulcrum points; and, when sufficient force is developed by the lever assembly in response to decreasing temperature to overcome the magnetic attraction between magnet 108 and valve lever 66 and the pressure differential between chambers 22 and 27 across valve face 96, control valve 24 will snap open without any graduation or creep to place the condition responsive control device 10 in the on state which decreases the pressure in chamber 27 and, accordingly, on the underside of the main diaphragm valve to permit it to open. Pressure regulator 14 is now operative to control pressure in the bleed line and thereby regulates outlet pressure for the combination control device.

Opening of the main diaphragm valve will permit a flow of fuel to an appliance which will in turn heat the space in which bulb 30 is disposed; and, as the temperature sensed by bulb 30 increases, actuator member 36 is extended to pivot thrust lever 56 and valve lever 66 clockwise about their respective fulcrum points and against the force of power spring 88. The clockwise pivoting of the lever assembly 26 moves valve member 92 toward valve seat 90, and the magnetic attraction between magnet 106 and valve lever 66 coupled with the pressure differential across the valve face cause the control valve 24 to snap closed without throttling.

The operating temperature differential of the condition responsive control device 10, that is, the difference between the temperature at which the condition responsive control device is changed from off to on states and the temperature at which the condition responsive control device is changed from on to off states, can be adjusted by changing the gap between the magnet 108 and the valve lever 66, which cap can be changed merely by rotating stud 110. A change in the gap dimension has a greater effect on off-to-on operation than on on-to-off operation of the condition responsive control device 10 such that adjustment of the gap shifts the off-to-on and on-to-off temperatures unequally to change the operating temperature differential. Accordingly, when the magnetic gap is decreased, a greater force is required of the power spring 88 to open the control valve 24 as the temperature sensed by bulb 30 decreases thereby increasing the temperature differential and raising the off-to-on and on-to-off temperatures, and increasing the magnetic gap correspondingly reduces the temperature differential and lowers the off-to-on and on-to-off temperatures.

The compound lever assembly 26 provides amplification of movement of actuator member 36 in the order of sixteen times due to the positioning of actuator member 36 near end 60 of thrust lever 56 and the positioning of the fulcrum points of valve lever 66. The application of the condition responsive force from actuator member 36 and the bias force from spring 88 to different levers not only facilitates assembly of the condition responsive control device 10 but assures tight sealing of control valve 24 during override which is a condition that exists when bulb 30 senses a temperature higher than the set point of temperature dial 40. During override, actuator member 36 will pivot thrust lever 56 clockwise about the fulcrum at tongue 52; however, since control valve 24 is already closed, valve lever 66 cannot pivot about the fulcrums at protrusions 84 and, accordingly, lugs 76 and 78 will slide down in slots 80 and 82 such that the force from spring 88 aids in maintaining the control valve closed without sole dependence on magnet 108. Thus, application of the bias force from power spring 88 directly to the valve lever assures proper operation during override, such operation further being enhanced by the freedom of the valve lever 66 to move away from the fulcrum points during override to prevent overstressing of the power element 34.

The recessing of the soft valve face 96 with respect to the upper surface of the operating end 94 of valve lever 66 serves to limit compression of the soft valve face 96 due to the stop provided by engagement of annular marginal edge 106 with shoulder 104 axially spaced from and surrounding valve seat 90 to prevent distortion of the valve face and further serves to maintain a fixed gap between magnet 108 and valve lever 66 independent of indentation or compression of the soft valve face. Thus, a soft valve face is utilized in accordance with the present invention to provide tight sealing valve operation without the normally concomitant valve face distortion and change in operating temperature differential.

Figure 5:
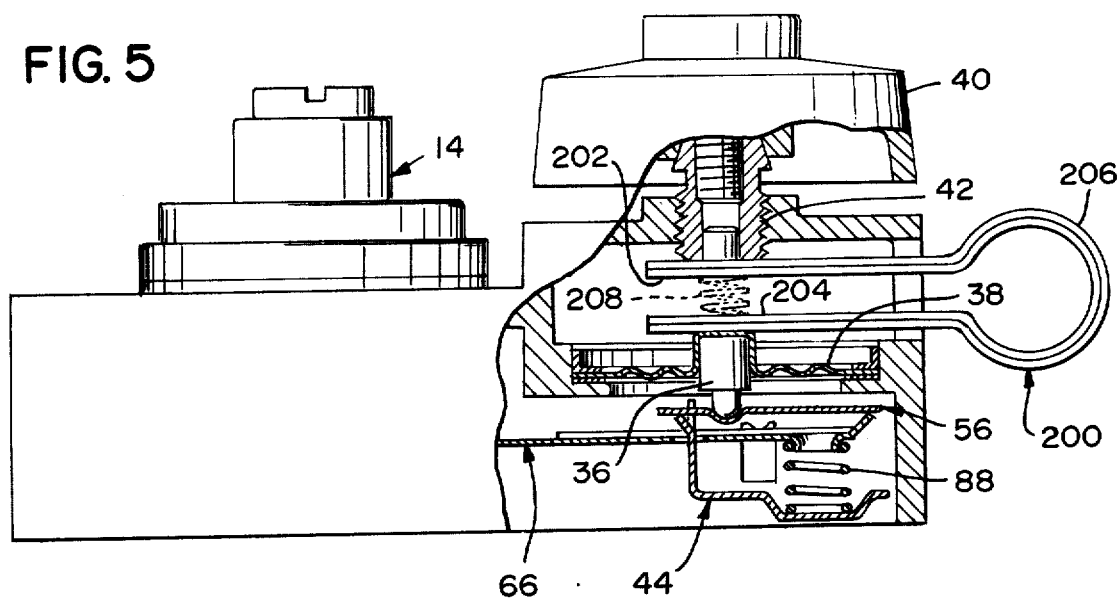
FIG. 5 is a broken side elevation of another embodiment of a condition responsive control device according to the present invention.

Another embodiment of a condition responsive control device according to the present invention is illustrated in FIG. 5, the primary difference between the embodiments of FIGS. 1 and 5 being the use of a bimetal temperature sensing assembly in place of the hydraulic temperature sensing assembly of FIG. 1. Parts in the embodiment of FIG. 5 identical to parts in the embodiment of FIG. 1 are given identical reference numbers and are not described again.

The bimetal temperature sensing assembly of the condition responsive control device of FIG. 5 includes a looped bimetal member 200 having a pair of parallel legs 202 and 204 interconnected by a body 206 having a C-configuration in cross section. Leg 202 has an end engaging temperature adjusting screw 42, and leg 204 has an end abutting actuator member 36 at sealing diaphragm 38. The high expansion side of the bimetal is disposed on the interior and the low expansion side of the bimetal is disposed on the exterior of the looped member 200 such that the loop of the bimetal will expand with increasing temperature to move actuator member 36 toward thrust lever 56 and will contract with decreasing temperature to move actuator member 36 away from thrust lever 56. The operation of the condition responsive control device of FIG. 5 is, thus, the same as that described with respect to the embodiment of FIG. 1.

In order to counter balance the effect of power spring 88 tending to open the control valve, the bimetal member 200 should apply a constant spring force on the lever assembly to maintain the control valve closed when there is no heat demand. Accordingly, a helical spring 208 is mounted in compression between legs 202 and 204 of the bimetal member 200, as shown in phantom, with the spring force of the bimetal member 200 being such that if the spring 208 were removed legs 202 and 204 would move toward each other. Spring 208 provides sufficient force to balance the valve opening force of power spring 88 with the legs 202 and 204 acting to contain the spring. If spring 208 were not employed and the bimetal member 200 crept or took a set due to the constant load of the power spring the calibration temperature would be increased possibly causing unsafe conditions; however, with the use of spring 208, creepage of the bimetal member 200 would lower the calibration temperature. Furthermore, if the bimetal member 200 should break, spring 208 will continue to supply sufficient force to maintain the control valve closed thereby providing fail-safe operation.

Inasmuch as the present invention is subject to many variations, modifications and changes in detail, it is intended that all matter described above or shown in the drawings be interpreted as illustrative and not in a limiting sense.

What is claimed is:

1. A condition responsive control device comprising a housing;

control valve means including a projecting valve seat formed in said housing, a valve member having a soft valve face cooperating with said valve seat to control flow therethrough, and rigid shoulder means disposed adjacent said valve seat;

condition responsive means including an actuator member movable with changes in the condition being sensed;

lever means pivotally mounted in said housing to engage said actuator member and having a rigid operating end carrying said valve member and defining a rigid abutment surface;

said operating end having an aperature for receiving the projecting valve seat and having an underside surface portion surrounding the aperature;

a valve clip secured to the underside of the operating end for sandwiching an edge portion of the soft valve face against the underside surface portion over the aperature; and magnetic means including an armature carried by said lever means and a magnet mounted in said housing adjacent said control valve means, said abutment surface engaging said shoulder means when said control valve means is closed to define a fixed gap between said magnet and said armature.

2. The condition responsive control device as recited in claim 1 wherein said lever means includes a thrust lever engaging said actuator member, first fulcrum means pivotally mounting said thrust lever in said housing, a valve lever having a first end defining said operating end of said lever means and a second end engaging said thrust lever, and second fulcrum means pivotally mounting said valve lever in said housing.

3. The condition responsive control device as recited in claim 2 wherein said lever means includes bias means applying a force to said valve lever between said second fulcrum means and said second end.

4. The condition responsive control device as recited in claim 3 wherein said second fulcrum means is disposed on a second side of said valve lever opposite a first side of said valve lever engaging said bias means.

5. A condition responsive control device comprising a housing;

control valve means including a valve seat formed in said housing, a valve member cooperating with said valve seat to control flow therethrough and shoulder means disposed adjacent said valve seat;

condition responsive means including an actuator member movable with changes in the condition being sensed;

lever means pivotally mounted in said housing to engage said actuator member and having an operating end carrying said valve member and an abutment surface, said valve member being recessed relative to said abutment surface, said lever means including a thrust lever engaging said actuator member, first fulcrum means pivotally mounting said thrust lever in said housing, a valve lever having a first end defining said operating end of said lever means and a second end engaging said thrust lever, second fulcrum means pivotally mounting said valve lever in said housing, said second fulcrum means including first and second spaced slotted walls in said housing, said valve lever having first and second lugs received in said slots in said first and second walls, respectively, and bias means including a helical spring mounted in compression to bias said lugs against ends of said slots; and magnetic means including an armature carried by said lever means and a magnet mounted in said housing adjacent said control valve means, said abutment surface engaging said shoulder means when said control valve means is closed to define a fixed gap between said magnet and said armature.

6. The condition responsive control device as recited in claim 5 wherein said valve lever has an aperture in said operating end with said abutment surface extending marginally around said aperture, and said valve means includes a soft valve face mounted on said operating end across said aperture, said aperture having a configuration to receive said valve seat therein to seal with said valve face.

7. The condition responsive control device as recited in claim 5 wherein said operating end of said lever means has an aperture therein with said abutment surface extending marginally around said aperture, and said valve means includes a soft valve face mounted on said operating end across said aperture, said aperture having a configuration to receive said valve seat therein to seal with said valve face.

8. The condition responsive control device as recited in claim 6 wherein said valve lever is made of a ferromagnetic material to form said armature and said magnet is adjustably mounted in said housing to permit adjustment of the gap between said magnet and said valve lever.

9. The condition responsive control device as recited in claim 8 wherein said valve lever has a lateral slot therein, said first fulcrum means includes a fulcrum bracket having a base mounting said helical spring, an upstanding leg extending through said lateral slot in said valve lever, and a bent tongue at the end of said leg, and thrust lever has a first end supported on said bent tongue and a second end engaging said second end of said valve lever, said actuator member engaging said thrust lever between said first and second ends thereof closer to said first end.

10. The condition responsive control device as recited in claim 9 wherein said condition responsive means includes a hydraulic temperature sensing assembly including a sensing bulb, a capillary tube and a power element filled with a thermally expansible fluid.

11. The condition responsive control device as recited in claim 9 wherein said condition responsive means includes a bimetal member having a pair of spaced legs interconnected by a curved body.

12. The condition responsive control device as recited in claim 11 wherein said condition responsive means includes a spring mounted in compression between said spaced legs, the ends of said spaced legs being closer together when said spring is removed than when said spring is mounted therebetween.

13. The condition responsive control device as recited in claim 1 wherein said condition responsive means includes a hydraulic temperature sensing assembly including a sensing bulb, a capillary tube and a power element filled with a thermally expansible fluid.

14. The condition responsive control device as recited in claim 1 wherein said condition responsive means includes a temperature adjustment screw spaced from said actuator member and a bimetal member having a pair of spaced legs engaging said adjustment screw and said actuator member, respectively, and a curved body interconnecting said spaced legs.

15. The condition responsive control device as recited in claim 14 wherein said condition responsive means includes a spring mounted in compression between said spaced legs, the ends of said spaced legs being closer together when said spring is removed than when said spring is mounted therebetween.

16. A condition responsive control device comprising a housing;

control valve means including a valve seat formed in said housing, a valve member cooperating with said valve seat to control flow therethrough and shoulder means disposed adjacent said valve seat;

condition responsive means including an actuator member movable with changes in the condition being sensed;

lever means pivotally mounted in said housing to engage said actuator member and having an operating end carrying said valve member and an abutment surface, said valve member being recessed relative to said abutment surface; and magnetic means including an armature carried by said lever means and a magnet mounted in said housing adjacent said control valve means, said abutment surface engaging said shoulder means when said control valve means is closed to define a fixed gap between said magnet and said armature, said operating end of said lever means having an aperture therein with said abutment surface extending marginally around said aperture, and said valve means including a soft valve face mounted on said operating end across said aperture, said aperture having a configuration to receive said valve seat therein to seal with said valve face.

17. The condition responsive control device as recited in claim 16 wherein said lever means includes a thrust lever engaging said actuator member, first fulcrum means pivotally mounting said thrust lever in said housing, a valve lever having a first end defining said operating end of said lever means and a second end engaging said thrust lever, and second fulcrum means pivotally mounting said valve lever in said housing.

18. The condition responsive control device as recited in claim 17 wherein said lever means includes bias means applying a force to said valve lever between said second fulcrum means and said second end, said second fulcrum means being disposed on a second side of said valve lever opposite said first side of said valve lever engaging said bias means.

* * * * *